United States Patent
Hoke et al.

(10) Patent No.: US 11,531,195 B2
(45) Date of Patent: Dec. 20, 2022

(54) REFLECTIVE BIJECTIVE METHOD AND DEVICE FOR CODED APERTURE IMAGE ACQUISITION AND RECONSTRUCTION

(71) Applicant: The Charles Stark Draper Laboratory, Inc., Cambridge, MA (US)

(72) Inventors: Eric Hoke, Somerville, MA (US); Jeffrey Korn, Lexington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 484 days.

(21) Appl. No.: 16/082,132

(22) PCT Filed: Mar. 7, 2017

(86) PCT No.: PCT/US2017/021086
§ 371 (c)(1),
(2) Date: Sep. 4, 2018

(87) PCT Pub. No.: WO2017/155944
PCT Pub. Date: Sep. 14, 2017

(65) Prior Publication Data
US 2019/0101745 A1 Apr. 4, 2019

Related U.S. Application Data

(60) Provisional application No. 62/305,335, filed on Mar. 8, 2016.

(51) Int. Cl.
*G02B 26/08* (2006.01)
*G06N 20/00* (2019.01)
*G02B 7/182* (2021.01)

(52) U.S. Cl.
CPC ......... *G02B 26/0833* (2013.01); *G02B 7/182* (2013.01); *G06N 20/00* (2019.01); *G02B 2207/129* (2013.01)

(58) Field of Classification Search
None
See application file for complete search history.

(56) References Cited

U.S. PATENT DOCUMENTS 9,182,278 B2 * 11/2015 Day .......................... G01J 3/16
9,195,053 B2 * 11/2015 El-Ghoroury .......... H04N 13/32
(Continued)

FOREIGN PATENT DOCUMENTS

| CN | 103402040 | 11/2013 |
| WO | WO 0223794 | 3/2002 |

OTHER PUBLICATIONS

Bondareva, A.P., et al., "Modeling of Digital Information Optical Encryption System with Spatially Incoherent Illumination," Proc. of SPIE, 9648: 96480S-1-96480S-9 (2015).
(Continued)

*Primary Examiner* — Collin X Beatty
*Assistant Examiner* — Grant A Gagnon
(74) *Attorney, Agent, or Firm* — HoustonHogle LLP

(57) ABSTRACT

A bijective coded aperture system uses mirror system with a multitude of reflector elements attached to an absorbing, such as black, substrate. Each of the reflector elements is independently placed at a different angle with respect to each other in such a manner that the image of the scene is replicated several times at the focal plane and on the image sensor. Moreover, these replicated images may be overlapping. An image processor can then execute reconstruction methods of the image to faithfully represent the scene.

23 Claims, 7 Drawing Sheets

(56) References Cited

U.S. PATENT DOCUMENTS

2016/0202178 A1\* 7/2016 Acosta ..................... G01J 3/18
356/303
2017/0176338 A1\* 6/2017 Wu ....................... G01J 3/2823

OTHER PUBLICATIONS

Fenimore, E.E., et al., "Coded Aperature Imaging with Uniformly Redundant Arrays," Applied Optics, 17(3): 337-347 (1978).
Gottesman, S.R., et al., "New Family of Binary Arrays for Coded Aperature Imaging," Applied Optics, 28(20): 4344-4352 (1989).
International Search Report and Written Opinion of the International Searching Authority, dated Jun. 1, 2017, from International Application No. PCT/US2017/021086, filed on Mar. 7, 2017. 13 pages.
Tran, D.N., et al., "Compressive Coding Via Random Replicate Mirror," IEEE, 148-152 (2016).
International Preliminary Report on Patentability of the International Searching Authority, dated Sep. 20, 2018, from International Application No. PCT/US2017/021086, filed on Mar. 7, 2017. 7 pages.

\* cited by examiner

REFLECTIVE BIJECTIVE METHOD AND DEVICE FOR CODED APERTURE IMAGE ACQUISITION AND RECONSTRUCTION

RELATED APPLICATIONS

This application is a § 371 National Phase Application of International Application No. PCT/US2017/021086, filed on Mar. 7, 2017, now International Publication No. WO 2017/155944 A1, published on Sep. 14, 2017, which International Application claims the benefit under 35 USC 119(e) of U.S. Provisional Application No. 62/305,335, filed on Mar. 8, 2016, which is incorporated herein by reference in its entirety both of which are incorporated herein by reference in their entirety.

BACKGROUND OF THE INVENTION

Coded Aperture or Coded-Aperture Mask imaging is a technique often used for imaging high energy radiation. The aperture is coded in the sense that it includes typically a known mask, grid, grating, or other pattern of materials opaque to the wavelength of radiation of interest. By blocking or otherwise modulating the radiation from the scene in a known pattern, a coded "shadow" is cast on the imaging plane. An image of the scene can then be mathematically reconstructed from this shadow.

Coded apertures are used for high energy radiation because of the dearth of lenses or mirrors for these high-energy rays. The concept evolved from a simple pinhole camera configuration to the use of many pinholes that form the aperture. The pinholes are arranged randomly. Each hole creates a shadow of the aperture.

This approach yields a number of advantages. It can maintain the high angular resolution of a small single pinhole system. The signal to noise ratio, however, is related to the total area of all of the pinholes.

The images from the individual pinholes will typically overlap at the imaging plane. Thus, image processing is required to convert the detected image into the reconstructed image of the original scene. Generally, the image processing is based on a deconvolution or a correlation. The image is formed from the whole array of pixels of the image sensor and is therefore tolerant to faults in individual pixels or even multiple pixels within a region of the sensor.

SUMMARY OF THE INVENTION

The present invention concerns a coded aperture imaging system. It uses a bijective arrangement in which the coded aperture is implemented in a mirror system, A lens system is then used to form an image at the focal plane where an image sensor is placed.

This system can be used to improve data rate efficiency, and fidelity of image acquisition processes. The coding of the optical signals from their original representation to a mapped state can be exploited to provide the benefit of information retention in the presence of noise, etc.

With the present invention, object points of a scene are mapped to an image plane such that the mapping is bijective with the primary differentiating feature being a spatial shift variant process. Whereby the transfer function, sometimes referred to as the point spread function (SPF), is described by an inhomogeneous Fredholm Equation.

The system includes a mirror system with a multitude of submirrors or reflector elements attached to an absorbing, such as black, substrate. Each of the reflector elements is planar and independently placed at a different angle with respect to each other in such a manner that the image of the scene is replicated several times at the focal plane and on the image sensor. Moreover, these replicated images may be overlapping. An image processor can then execute reconstruction methods of the image to faithfully represent the scene. These methods seek solutions based on error minimization. Such a device is placed within the Fraunhaufer regime of the optical field.

The present system can be applied to imaging applications where power is constrained, or low-error rates are required, for example. It can also be used to reduce the effects of a partially obscured path from the scene.

This system can be used in compressed sensing to reduce the required data to be transmitted, for example. Here, rather than compressing the entire scheme, the pixels are scrambled allowing the entire scene to be sampled with a smaller amount of data and computing power.

In general, according to one aspect, the invention features a coded aperture imaging system. The system comprises a mirror system for reflecting light from a scene, the mirror system comprising reflector elements that are positioned at different angles with respect to each other relative to a plane of the mirror system. An object lens system collects the light from the mirror system and an image sensor detects the light from the objective lens.

In embodiments, the different angles of the reflector elements fall within a range in which the light from the scene is reflected within a numerical aperture of the objective lens system. Also, in some cases, at least some of the reflector elements can be spaced away from the plane of the mirror system.

Generally, the reflector elements are each planar mirrors and the reflector/mirror elements are supported on an absorbing substrate.

In other cases, the mirror system comprises a tip/tilt mirror array such as a micro electromechanical system (MEMS) tip/tilt mirror array.

In the illustrated embodiment, the image sensor is located at a focal distance of the object lens.

An image processor is typically employed for recovering the image of the scene based on the positioning of the reflector elements. This image processor determines or learns a mapping between the scene and an image detected by the image sensor.

In general according to another aspect, the invention features a coded aperture imaging method. This method comprises reflecting light from a scene with reflector elements that are positioned at different angles with respect to each other relative to a plane of a mirror system, collecting the light from the mirror system, and detecting the collected light.

In general, according to another aspect, the invention features an imaging system. The system comprises a mirror system for reflecting light from a scene, the mirror system comprising a MEMS mirror array comprising reflector elements that are positioned at different angles with respect to each other, an object lens system for collecting the light from the mirror system, and an image sensor for detecting the light from the objective lens.

In general, according to another aspect, the invention features a coded aperture imaging method, comprising: detecting light from a known scene through a coded aperture and determining a mapping of the aperture using machine learning.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete; and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
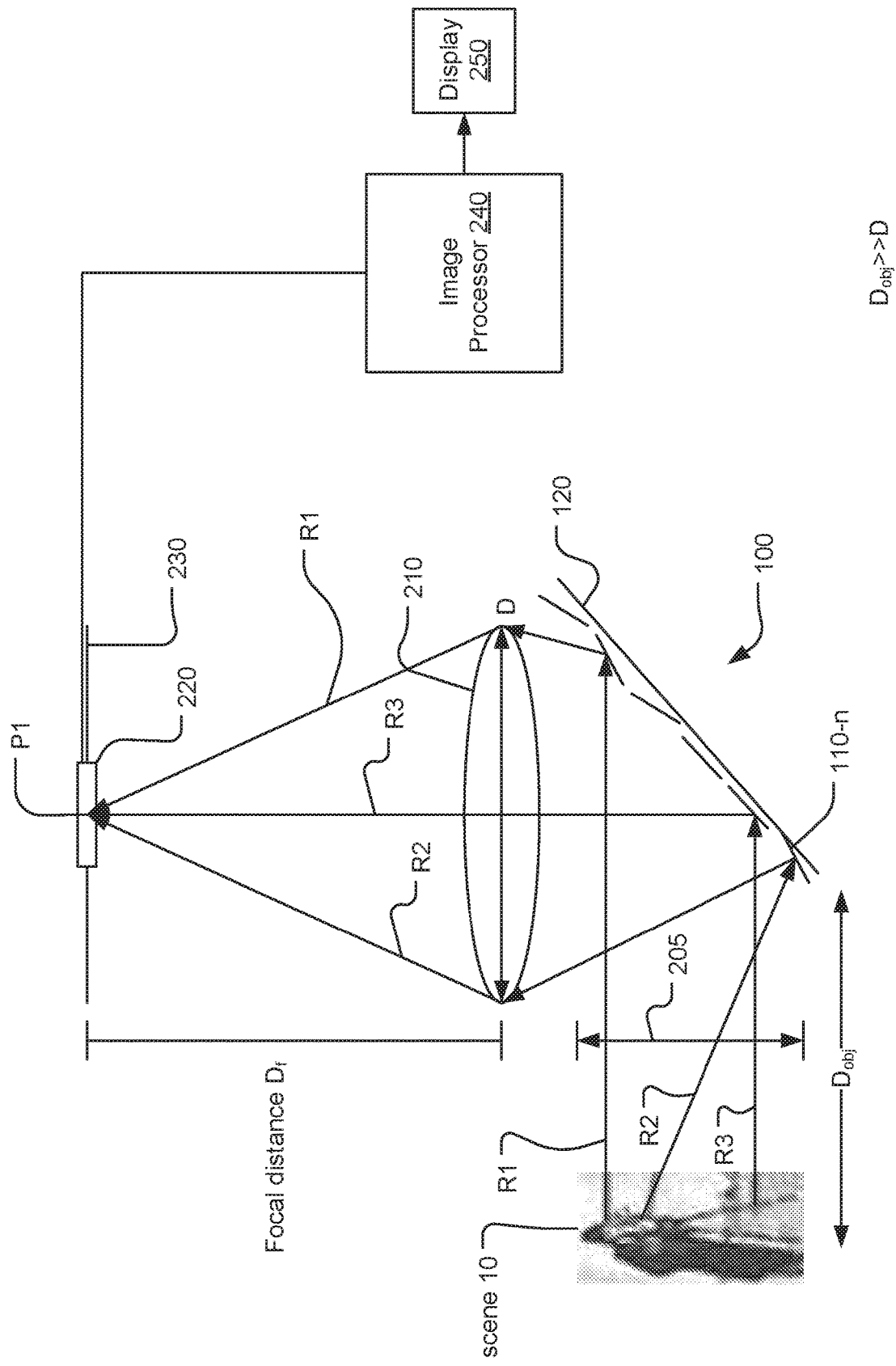
FIG. 1 is a schematic diagram of a coded aperture imaging system according to the present invention.

FIG. 1 shows the coded aperture imaging system which has been constructed according to the principles of the present invention. It is generally a bijective configuration. It uses a mirror system 100 to relay light from the scene 10 to the objective lens system 210 and then to the image sensor 220.

In more detail, light radiates from the scene. Specifically, rays R1, R2, and R3 are shown. These are received through the entrance aperture 205 of the system.

The light and specifically rays R1, R2, and R3 are reflected by a mirror system 100. This mirror system is unique in that it is constructed from an array of mirror or reflector elements 110. Generally, the mirror system 100 is planar extending perpendicular to the drawing. The reflector elements 110 are distributed over its surface. According to the invention, the reflector elements are each planar mirror that are positioned at different angles with respect to each other and relative to the plane of the mirror system 100. Generally, the angles of the reflector elements fall within a range in which light from the scene will be reflected within the numerical aperture of subsequent objective lens system 210.

The objective lens system 210 collects the light from the mirror system 100 and specifically the individual reflector elements 110. This light is then focused by the objective lens system 210 onto the focal plane 230 and specifically an image sensor 220 installed at the focal plane. Specifically, the image sensor 220 is installed at the focal point of the objective lens system 210 having a focal distance of $D_f$.

In most embodiments, the image sensor 220 is a spatially (two-dimensionally) resolved image sensor. It comprises a series of pixels or sensor elements that are arrayed in a regular two-dimensional array.

Generally, the type of image sensor is chosen based upon wavelength of interest. For example, x-rays are typically detected with a scintillated image sensor, whereas CMOS and CCD arrays are common when detecting light in and near the visible wavelengths.

The traced rays R1, R2, and R3 illustrate a characteristic of many coded aperture imaging systems and the present system. Specifically, despite the fact that traced rays R1, R2, and R3 originate from different parts of the scene, they are all directed to the same location at the focal plane 230 and specifically the image sensor 220. The consequence of this configuration is that the response at any portion of the image sensor 220 is a summation of multiple parts of the scene 10. Stated another way, multiple parts of the scene are also imaged to different portions of the image sensor 220. As a consequence, the image detected by the image sensor 220 must thereafter be decoded in order to recover the actual image of the scene 10.

In the typical application, the image detected by the sensor array 220 is provided to an image processor 240. This image processor 240 typically decodes the detected image to recover the image of the scene 10. This recovered image can then be displayed on a display 250, for example, and/or processed and further transmitted.

In general, the present system works best when the distance to the scene $D_{obj}$ is much greater than the diameter $D_L$ of the objective lens system 210. In general, $D_{obj}$ should be at least 10 times larger than $D_L$.

Figure 2:
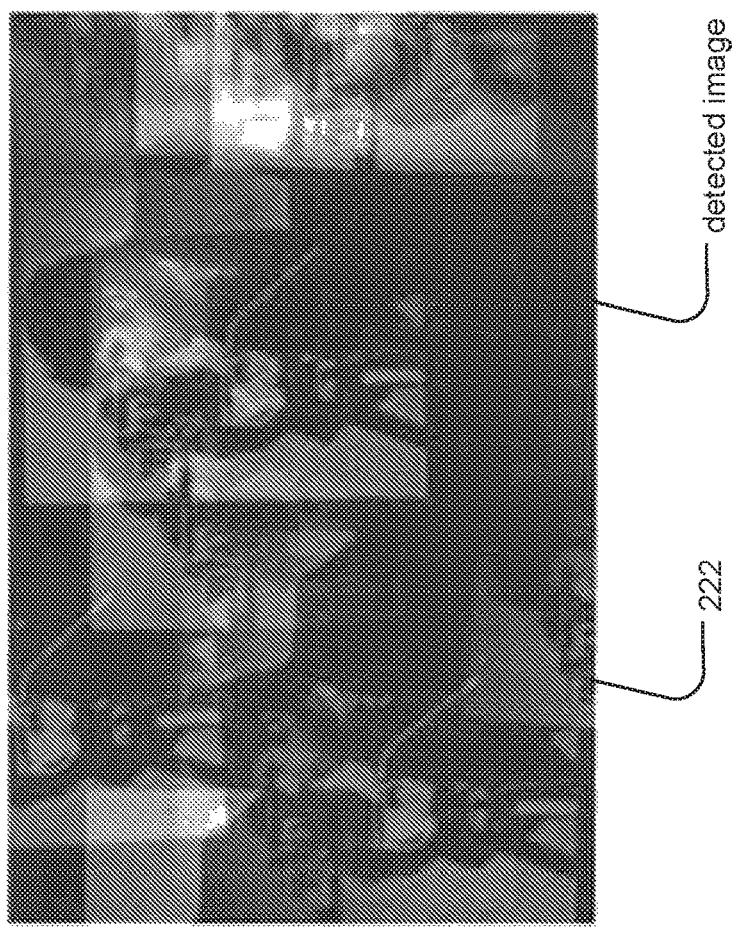
FIG. 2 shows the scene and the detected image, which is detected at the focal plane of the coded aperture imaging system.
Figure 2:
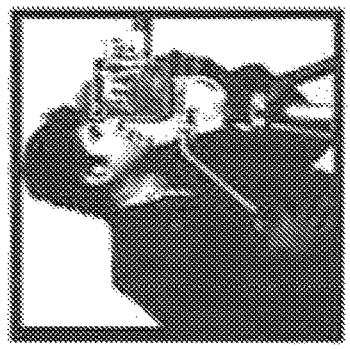

FIG. 2 illustrates the operation of the coded aperture imaging system. The scene 10 is converted into the detected image 222 produced by the image sensor 220. This image is a composite of the scene 10. The scene, however, is replicated over the extent of the image sensor 220. As a result, each detector element or pixel of the image sensor 220 and specifically its response is a function of multiple parts of the original scene.

Figure 3:
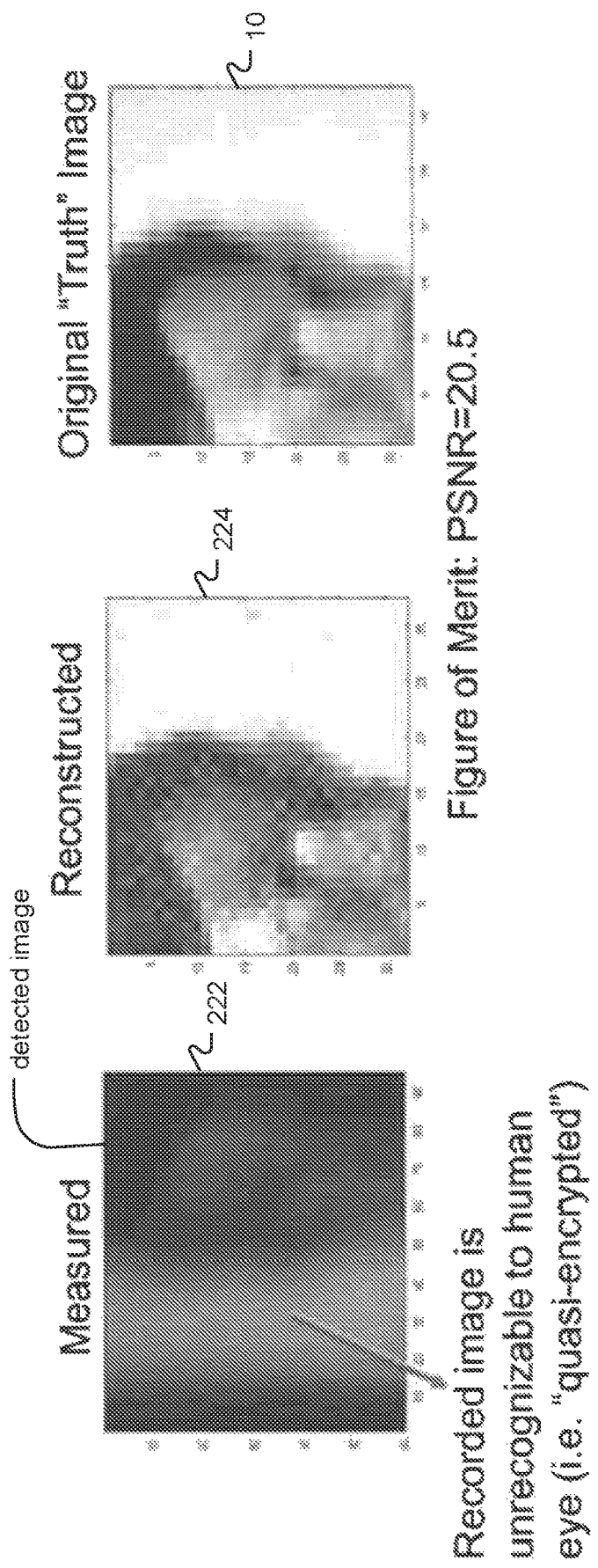
FIG. 3 shows the detected image and the reconstructed image, which was generated by the image processor according to the present invention.

FIG. 3 illustrates the reconstruction performed by the image processor 240. The detected image 222, in some cases, where there is a large number of reflector elements 110 in the mirror system 100, may be hard or even impossible for the human eye to decode. The image processor 240, however, by executing a reconstruction, such as one based upon a correlation or deconvolution, for example, can yield the reconstructed image 224, which will closely resemble the original scene 10.

In some embodiments, the image processor 240 utilizes machine learning in order to learn how to decode the detected images back into the original scene. The image processor 40 is first shown a set of calibration images that are used so that it can learn mapping of the scene to the detected image 222. This mapping is then reversed to reconstruct the unknown scene 10 from the detected image 222.

In other examples, the pointspread functions at each point in the scene can be determined to resolve the mapping and then used to decode the detected images.

Figure 4A:
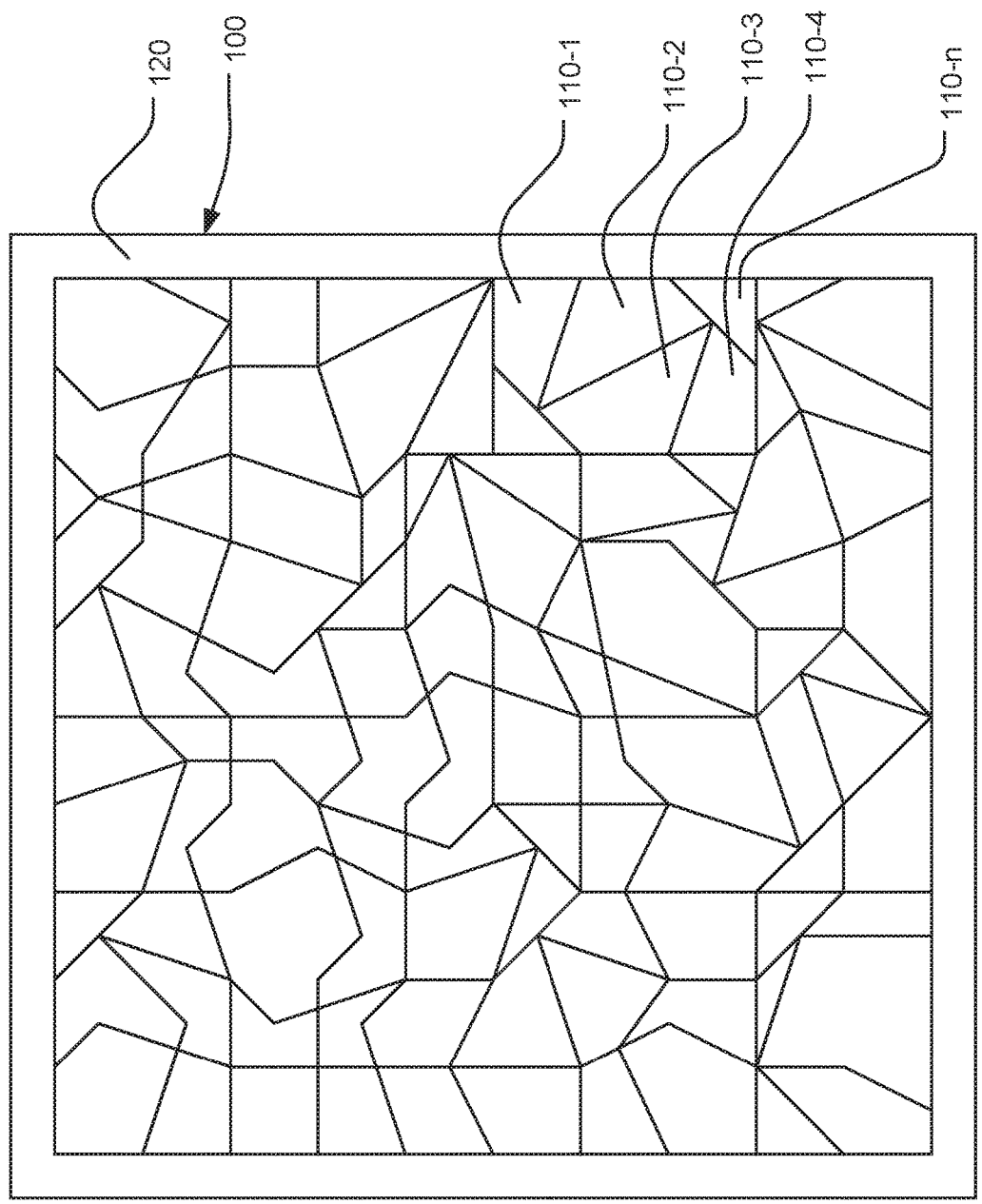
FIG. 4A is a plan view of a first embodiment of the mirror system.
Figure 4A:
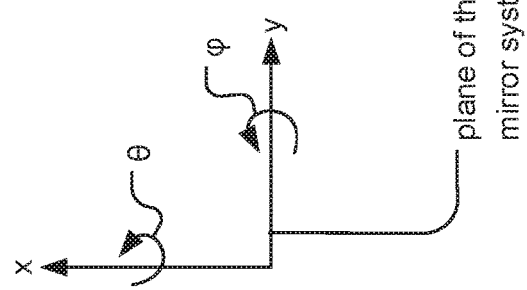

FIG. 4A illustrates a first embodiment of the mirror system 100. It generally comprises an array of reflector elements 110. The reflector elements are generally referred to with the reference numeral 110. Individual reflector elements are designated as 110-1, 110-2, 110-3, 110-4 . . . 110-*n*; only some of the reflector elements have been labeled for the clarity of the figure, however. In some embodiments, the number of reflector elements is small, such as about 5-10 or more than 10. However, in other examples the number of reflector elements can exceed 100, or a 1000, or there can be even more than a 1000 reflector elements in the mirror system 100.

This array of reflector elements 110 will typically cover a square or rectangular or circular or elliptical area that corresponds to the projection of the entrance aperture 205. Each of the separate reflector elements 110, such as 110-1, 110-2, 110-3, 110-4, . . . 110-*n* have a different angular relationship to the plane x, y of the mirror system 100. Specifically, each reflector element 110 will have a different combination of rotation around the x axis, angle $\theta$, and rotation around the y axis, angle $\varphi$. In some cases, the angles $\theta$, $\varphi$ are randomly selected. Typically, the reflector elements 110 are positioned over an absorbing substrate 120 so that light that is not reflected by any of the reflector elements does not reach the image sensor 220.

Generally, the two angles $\theta$, $\varphi$ can be used to characterize the orientation of each of the reflector elements 110 when they are located close to the plane of the mirror system 110. In some embodiments, however, some of the reflector elements are also spaced away from the plane of the mirror system 110 by varying degrees. In this case, two angles and a displacement distance are required to characterize their orientation. (This has an effect of independently translating and rotating the resulting subimage produced by the reflector element.)

Nevertheless, as noted earlier, the rotation angles $\theta$, $\varphi$, for each or most of the reflector elements 110 is constrained to a range such that light received from the desired portion of the scene 10 will fall within the numerical aperture of the objective lens system 210.

The range of angles $\theta$, $\varphi$ that the mirrors may take depends upon the specific lens iris/aperture setting and focal-plane array sensor size. If any one reflector element 110 is tilted too much, then the corresponding subimage may miss the sensor 220. Consider the example in which the sensor 220, in combination with the objective lens system 210, has a. Field-of-View (FOV) of 10 Degrees×10 Degrees and the sensor 220 has a 1000×1000 pixels. In this case, then each pixel will subtend 0.01 Degrees×0.01 Degrees of the scene. Thus, each reflector element 110 should have an angles $\theta$, $\varphi$, of not more than +/−5 Degrees, and as a practical matter probably the angles $\theta$, $\varphi$, should be less than +/−1 Degree to prevent the replicated images from being either walked off of clipped at the sensor 220.

This embodiment is characterized by the fact that each of the reflector elements has a generally similar area but have relatively random shapes.

Figure 4B:
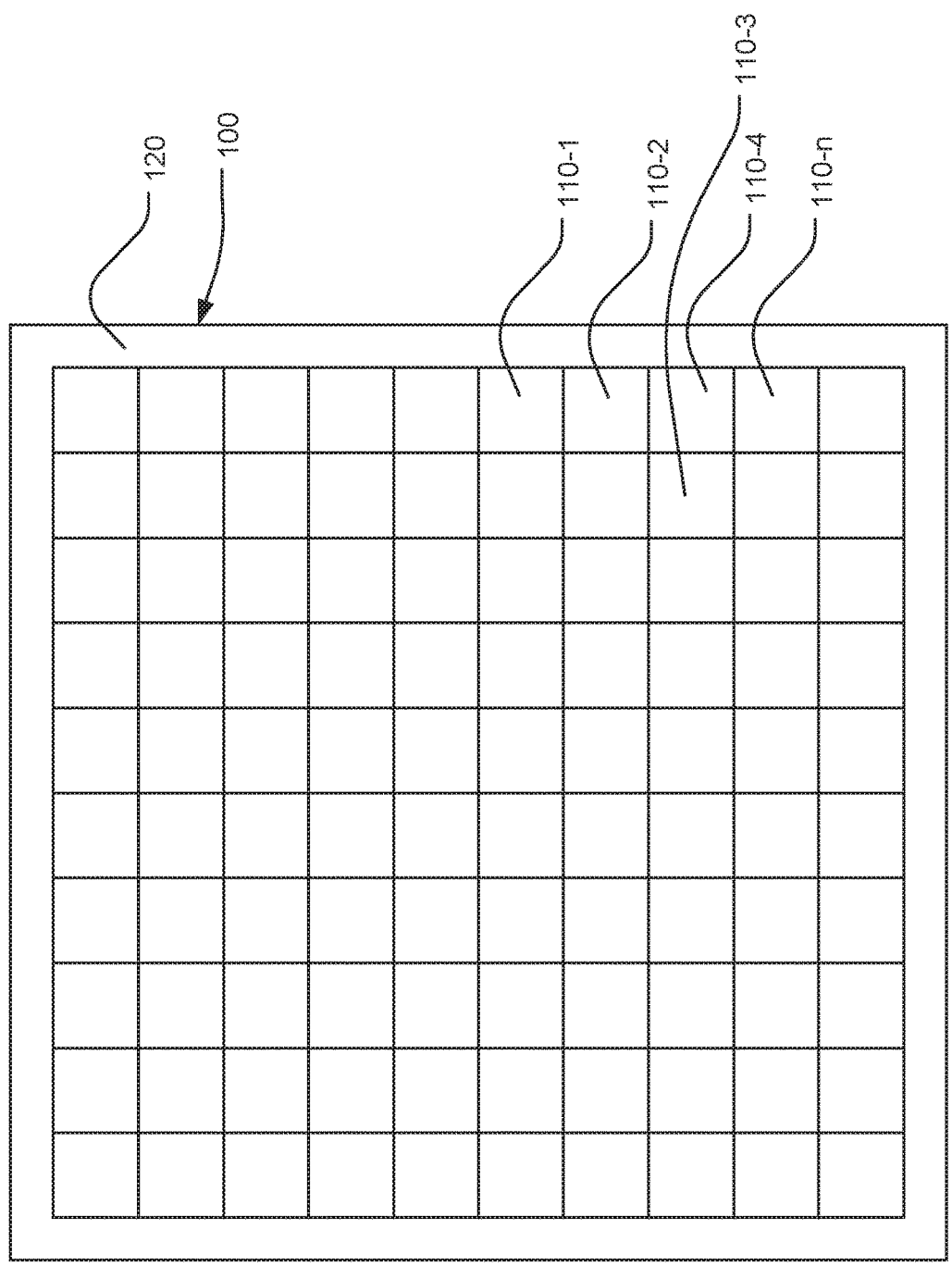
FIG. 4B is a plan view of a second embodiment of the mirror system.
Figure 4B:
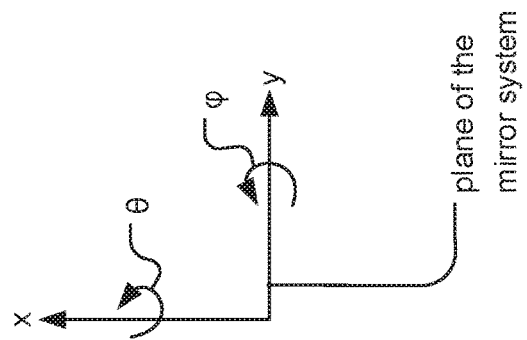

FIG. 4B illustrates a second embodiment of the mirror system. It also comprises an array of reflector elements. Each of the reflector elements 110, however, is generally square or rectangular.

Figure 5A:
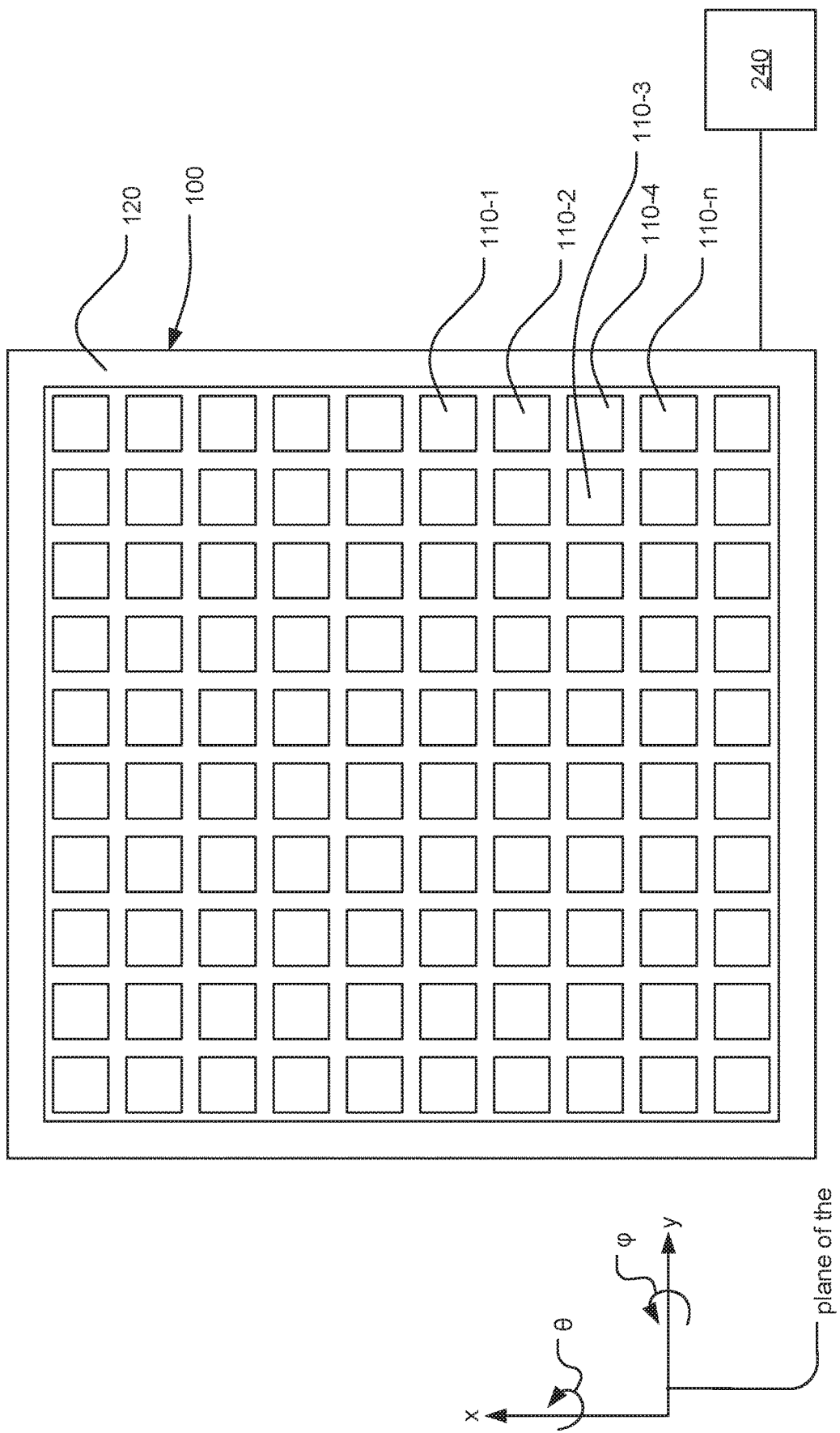
FIG. 5A is a plan view of a third embodiment of the mirror system.

FIG. 5A illustrates a third embodiment of the mirror system 100. In this embodiment, the reflector elements are active. That is the rotation angles $\theta$, $\varphi$, can be actively controlled by the image processor 240. This allows two things. First, positional feedback provided by the mirror system 100 concerning the angular position of each of the reflector elements 110-1, 110-2, 110-3, 110-4 . . . 110-*n* is used by the image processor 242 to resolve the encoding performed by the mirror system 100 and thereby facilitates the decoding of the detected image 222. Further, the active control of the mirror system 100 further allows the encoding to be changed over time. This can be used as an encryption process.

Figure 5B:
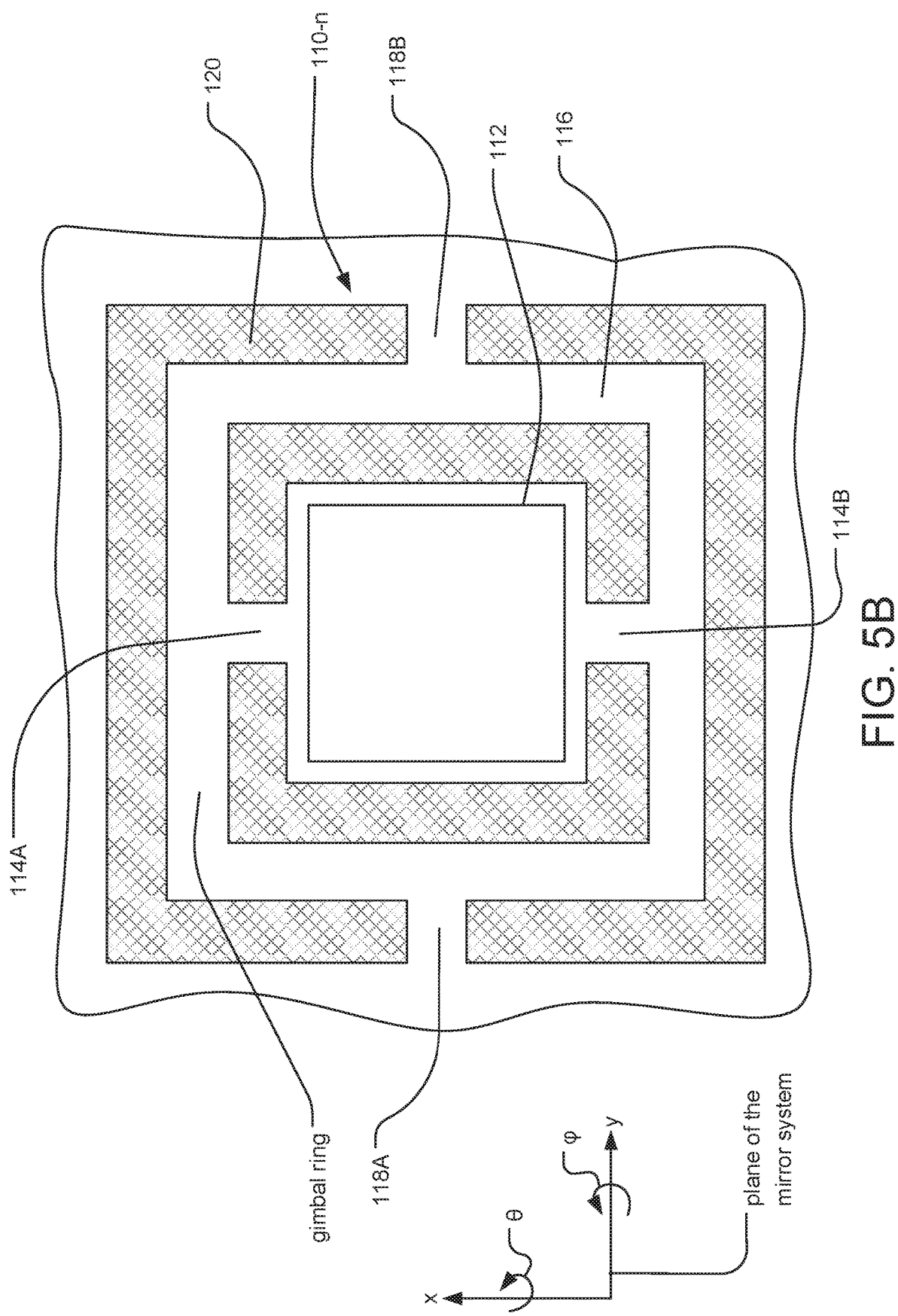
FIG. 5B shows a reflector element of the third embodiment of the mirror system.

FIG. 5B illustrates an example of an active reflector element 110 as used in the third embodiment of the mirror system 100. Specifically, a conventional micro-electromechanical system (MEMS) tip-tilt mirror is shown. Specifically, the active mirror comprises a reflecting portion 210 at its center. This center area is connected via two $\theta$ torsion arms 114A, 114B to a gimbal ring 116. The gimbal ring in turn is connected to the mirror system substrate by two $\varphi$ torsion arms 118A, 118B.

In one example, the present system is used for compressed sensing applications. Since each pixel's response is a function of multiple areas of the scene, only a small portion of the pixels of the image sensor 220 need to be sampled and transmitted, for example, in order to at least partially characterize the scene 10 or changes to the scene.

While this invention has been particularly shown and described with references to preferred embodiments thereof, it will be understood by those skilled in the art that various changes in form and details may be made therein without departing from the scope of the invention encompassed by the appended claims.

What is claimed is:

1. A coded aperture imaging system, comprising:
    a tip/tilt mirror system for reflecting light from a scene, the tip/tilt mirror system comprising reflector elements that are positioned at different angles with respect to each other relative to an x, y plane of the tip/tilt mirror system in which the reflector elements have different combinations of rotation around an x axis, angle $\theta$, and rotation around a y axis, angle $\varphi$;
    an objective lens system for collecting the light from the tip/tilt mirror system; and
    an image sensor for detecting the light from the objective lens system, wherein the different rotation angles $\theta$, $\varphi$ of the reflector elements fall within a range in which the light from the scene is reflected by the reflector elements within a numerical aperture of the objective lens system to replicate an image of the scene several times on the image sensor;
    an image processor for recovering the image of the scene based on the positioning of the reflector elements;
    wherein the tip/tilt mirror system provides positional feedback concerning an angular position of each of the reflector elements used by the image processor to resolve encoding performed by the tip/tilt mirror system and thereby facilitates decoding of the image detected by the image sensor.

2. A system as claimed in claim 1, wherein at least some of the reflector elements are spaced away from the plane of the tip/tilt mirror system.

3. A system as claimed in claim 1, wherein the reflector elements are each planar mirrors.

4. A system as claimed in claim 1, wherein the reflector elements are supported on an absorbing substrate.

5. A system as claimed in claim 1, wherein the tip/tilt mirror system comprises a micro electromechanical system (MEMS) tip/tilt mirror array.

6. A system as claimed in claim 1, wherein the image sensor is located at a focal distance of the objective lens system.

7. A system as claimed in claim 1, wherein the image processor determines a mapping between the scene and the image detected by the image sensor.

8. A system as claimed in claim 1, wherein only a portion of the image detected by the image sensor is transmitted by an image processor to effect image compression of the scene.

9. A system as claimed in claim 1, wherein the image sensor is placed within the Fraunhaufer regime of an optical field.

10. A system as claimed in claim 1, wherein a distance to the scene is at least 10 times larger than a diameter of the objective lens system.

11. A system as claimed in claim 1, wherein parts of the scene are imaged to different portions of the image sensor requiring an image detected by the image sensor to be decoded to recover an actual image of the scene.

12. A system as claimed in claim 1, wherein each of the reflector elements comprise one or more $\theta$ torsion arms and one or more $\varphi$ torsion arms, which are connected to each other via a gimbal ring.

13. A system as claimed in claim 1, wherein the tip/tilt mirror system comprises more than 1000 reflector elements.

14. A system as claimed in claim 1, wherein the rotation around the x axis, angle $\theta$, and rotation around the y axis, angle $\varphi$ is actively controlled by the image processor.

15. A coded aperture imaging method, comprising:
reflecting light from a scene with reflector elements that are positioned at different angles with respect to each other relative to an x, y plane of a tip/tilt mirror system, wherein the tip/tilt mirror system comprises a tip/tilt mirror array which is actively controlled in which the reflector elements have different combinations of rotation around an x axis, angle $\theta$, and rotation around a y axis, angle $\varphi$;
collecting the light from the tip/tilt mirror system with an objective lens system; and
detecting the collected light with an image sensor;
recovering the image of the scene based on the positioning of the reflector elements with an image processor;
wherein the different rotation angles $\theta$, $\varphi$ of the reflector elements fall within a range in which the light from the scene is reflected by the reflector elements within a numerical aperture of the objective lens system to replicate an image of the scene several times on the image sensor and
wherein the tip/tilt mirror system provides positional feedback concerning an angular position of each of the reflector elements used by the image processor to resolve encoding performed by the tip/tilt mirror system and thereby facilitate decoding of the image detected by the image sensor.

16. A method as claimed in claim 15, wherein at least some of the reflector elements are spaced away from the plane of the tip/tilt mirror system.

17. A method as claimed in claim 15, wherein the reflector elements are each planar mirrors.

18. A method as claimed in claim 15, wherein the reflector elements are supported on an absorbing substrate.

19. A method as claimed in claim 15, wherein the image sensor is located at a focal distance of the objective lens system.

20. A method as claimed in claim 15, further comprising recovering the image of the scene based on the positioning of the reflector elements.

21. A method as claimed in claim 15, further comprising determining a mapping between the scene and the image detected by the image sensor.

22. An imaging system, comprising:
a tip/tilt mirror system for reflecting light from a scene, the tip/tilt mirror system comprising a MEMS mirror array comprising reflector elements that are positioned at different angles with respect to each other in which the reflector elements have different combinations of rotation around an x axis, angle $\theta$, and rotation around a y axis, angle $\varphi$;
an objective lens system for collecting the light from the tip/tilt mirror system; and
an image sensor for detecting the light from the objective lens system, wherein the different rotation $\theta$, $\varphi$ angles of the reflector elements fall within a range in which the light from the scene is reflected by the reflector elements within a numerical aperture of the objective lens system to replicate an image of the scene several times on the image sensor;
wherein the tip/tilt mirror system provides positional feedback concerning an angular position of each of the reflector elements used by an image processor to resolve encoding performed by the tip/tilt mirror system and thereby facilitates decoding of the image detected by the image sensor.

23. The method as claimed in claim 15, further comprising:
determining a mapping of the aperture using machine learning.

* * * * *